(12) United States Patent
Heirman et al.

(10) Patent No.: US 12,333,305 B2
(45) Date of Patent: Jun. 17, 2025

(54) DELAYED CACHE WRITEBACK INSTRUCTIONS FOR IMPROVED DATA SHARING IN MANYCORE PROCESSORS

(71) Applicant: Intel Corporation, Santa Clara, CA (US)

(72) Inventors: Wim Heirman, Gent Vov (BE); Stijn Eyerman, Evergem (BE); Ibrahim Hur, Portland, OR (US)

(73) Assignee: Intel Corporation

( * ) Notice: Subject to any disclaimer, the term of this patent is extended or adjusted under 35 U.S.C. 154(b) by 961 days.

(21) Appl. No.: 17/033,770

(22) Filed: Sep. 26, 2020

(65) Prior Publication Data

US 2022/0100511 A1   Mar. 31, 2022

(51) Int. Cl.
G06F 9/30     (2018.01)
G06F 12/0804  (2016.01)

(52) U.S. Cl.
CPC ...... *G06F 9/30047* (2013.01); *G06F 12/0804* (2013.01); *G06F 2212/1021* (2013.01)

(58) Field of Classification Search
CPC ............ G06F 9/30047; G06F 9/30043; G06F 9/3004; G06F 12/0804
See application file for complete search history.

(56) References Cited

U.S. PATENT DOCUMENTS

| | | | |
|---|---|---|---|
| 5,327,570 A | 7/1994 | Foster et al. | |
| 8,190,826 B2 | 5/2012 | Lefebvre et al. | |
| 9,454,486 B2 | 9/2016 | Lilly et al. | |
| 9,496,009 B2 | 11/2016 | Sikdar et al. | |
| 10,564,972 B1 * | 2/2020 | Doshi | G06F 9/30145 |
| 2003/0005234 A1 | 1/2003 | Sperber et al. | |
| 2005/0219253 A1 | 10/2005 | Piazza et al. | |
| 2009/0216950 A1 * | 8/2009 | McCalpin | G06F 12/0833 711/E12.024 |
| 2010/0274940 A1 | 10/2010 | Ahmad et al. | |
| 2013/0282987 A1 | 10/2013 | Koob et al. | |
| 2015/0046658 A1 * | 2/2015 | Wilson | G06F 12/0895 711/135 |

(Continued)

FOREIGN PATENT DOCUMENTS

| | | |
|---|---|---|
| CN | 109144679 A | 1/2019 |
| CN | 106575275 B | 11/2020 |

(Continued)

OTHER PUBLICATIONS

International Search Report for International Application No. PCT/US17/51034, mailed Dec. 22, 2017, 3 pages.

(Continued)

*Primary Examiner* — Courtney P Spann
(74) *Attorney, Agent, or Firm* — Nicholson De Vos Webster & Elliott LLP

(57) ABSTRACT

Methods and apparatus relating to one or more delayed cache writeback instructions for improved data sharing in manycore processors are described. In an embodiment, a delayed cache writeback instruction causes a cache block in a modified state in a Level 1 (L1) cache of a first core of a plurality of cores of a multi-core processor to a Modified write back (M.wb) state. The M.wb state causes the cache block to be written back to LLC upon eviction of the cache block from the L1 cache. Other embodiments are also disclosed and claimed.

14 Claims, 12 Drawing Sheets

(56) References Cited

U.S. PATENT DOCUMENTS

| | | | |
|---|---|---|---|
| 2015/0058567 A1 | 2/2015 | Hechtman et al. | |
| 2015/0178202 A1* | 6/2015 | Sankaran | G06F 12/0804 |
| | | | 711/143 |
| 2015/0309933 A1 | 10/2015 | Nellans et al. | |
| 2016/0203085 A1 | 7/2016 | Kranich et al. | |
| 2016/0246723 A1* | 8/2016 | Doshi | G06F 9/30036 |
| 2017/0091090 A1* | 3/2017 | Wang | G06F 12/0808 |
| 2017/0293556 A1* | 10/2017 | Rozario | G06F 12/0842 |
| 2018/0107602 A1 | 4/2018 | Dasgupta et al. | |
| 2018/0121353 A1* | 5/2018 | Gaur | G06F 12/0831 |
| 2020/0201766 A1* | 6/2020 | Williams | G06F 12/0833 |
| 2020/0371935 A1* | 11/2020 | Chachad | G06F 9/4881 |
| 2021/0191753 A1 | 6/2021 | Pan et al. | |

FOREIGN PATENT DOCUMENTS

| | | |
|---|---|---|
| KR | 20160033737 A | 3/2016 |
| WO | 2018071121 A1 | 4/2018 |

OTHER PUBLICATIONS

International Written Opinion for International Application No. PCT/US17/51034, mailed Dec. 22, 2017, 6 pages.

Xiong, Wenjie, et al. "Leaking Information Through Cache LRU States," HPCA 2020 Presentation, Yale University, Feb. 24, 2020, 28 pages.

IBM Spectrum Scale, Change Version 5.0.2, "Cache Eviction," downloaded from "http://www.ibm.com/docs/en/spectrum-scale/5.0.2?topic=features-cache-eviction" on Nov. 2, 2022, 8 pages.

International Preliminary Report on Patentability for International Application No. PCT/US17/51034, mailed Dec. 22, 2017, 7 pages.

U.S. Appl. No. 18/089,757, filed Dec. 28, 2022, Ayan Mandal.

Faldu et al., "Reuse-Aware Management for Last-Level Caches," Institute for Computing System Architecture, CRC2, Jun. 25, 2017, 95 pages.

Frumusanu, Andrei, Apple's M1 Pro, M1 Max SoCs Investigated: New Performance and Efficiency Heights. Available at: https://www.anandtech.com/show/17024/apple-m1-max-performance-review/2, 8 pages, downloaded Oct. 13, 2022.

Gaur, Jayesh, Mainak Chaudhuri, and Sreenivas Subramoney. Bypass and insertion algorithms for exclusive last-level caches. Proceedings of the 38th annual international symposium on Computer architecture, Jun. 4-8, 2011, 12 pages.

International Search Report and Written Opinion for application No. PCT/CN2022/123618, issued Apr. 2, 2023, 8 pages.

M. K. Qureshi and Y. N. Patt, Utility-Based Cache Partitioning: A Low-Overhead, High-Performance, Runtime Mechanism to Partition Shared Caches, Micro'06, Orlando, FL, Sep. 25, 2006, pp. 423-432, 24 pages.

* cited by examiner

| L2 Cache Size | 16 Cores | 32 Cores | 64 Cores |
|---|---|---|---|
| 1 MB | 0.584 | 0.903 | 1.381 |
| 2 MB | 0.649 | 0.985 | 1.477 |
| 4 MB | 0.699 | 1.046 | 1.565 |

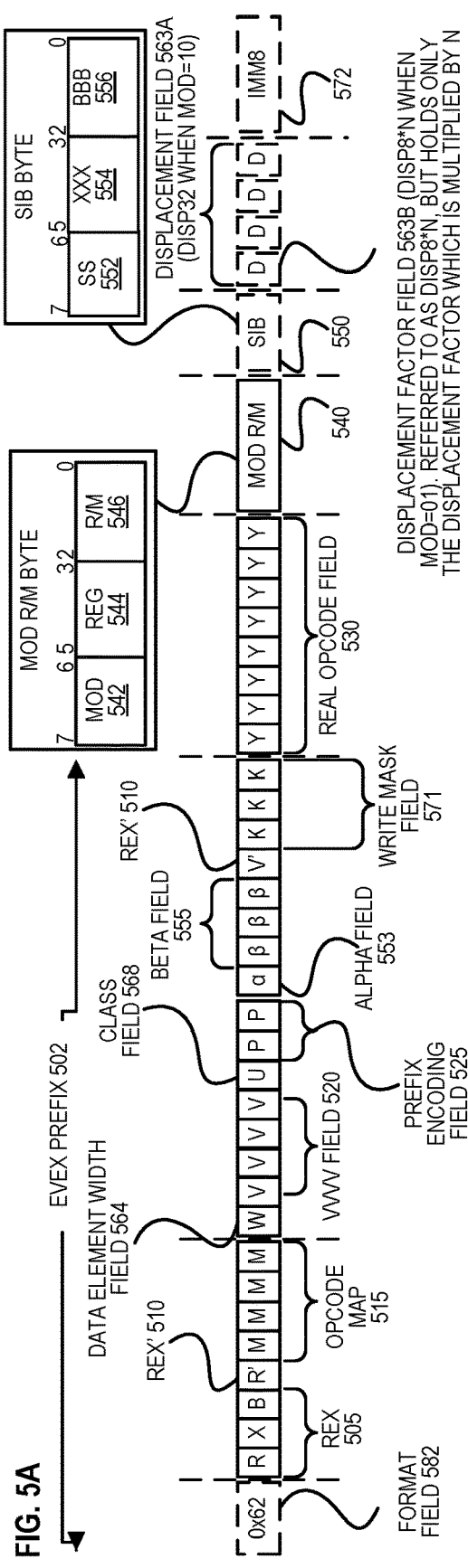
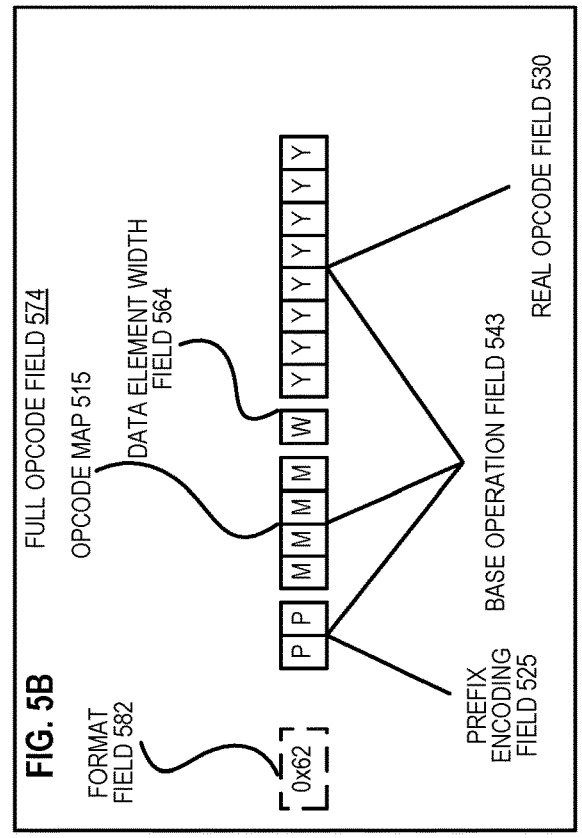
FIG. 5A
FIG. 5B
FIG. 5C

FIG. 6
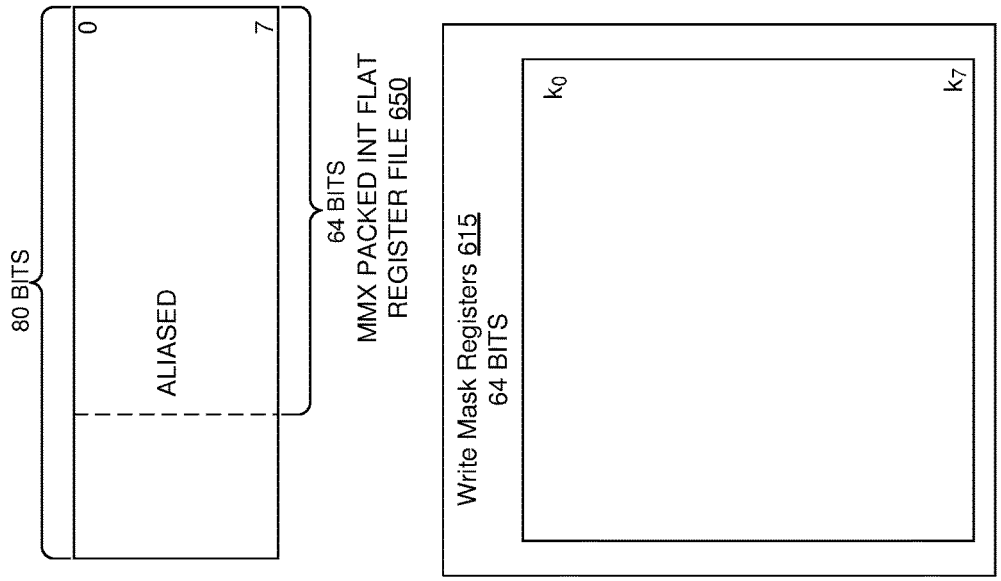
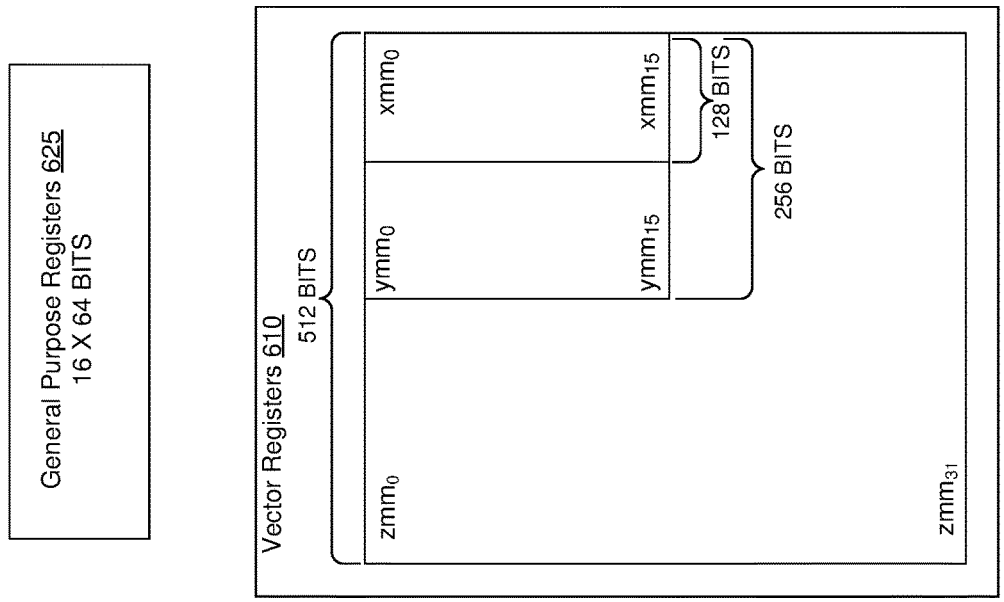

DELAYED CACHE WRITEBACK INSTRUCTIONS FOR IMPROVED DATA SHARING IN MANYCORE PROCESSORS

FIELD

The present disclosure generally relates to the field of electronics. More particularly, some embodiments relate to one or more delayed cache writeback instructions for improved data sharing in processors with multiple cores.

BACKGROUND

Manycore processors generally refer to processors with a multi-core design, where a plurality (e.g., tens to thousands or even more) processor cores are incorporated in one processor. Manycore processors are aimed at providing higher performance, e.g., for embedded computing, servers, etc.

In manycore processors running applications that have a large read/write shared data set, a significant amount of time may be lost waiting for cache coherency operations where a requesting core wants to fetch data that is held in a modified state in the cache of another core.

BRIEF DESCRIPTION OF THE DRAWINGS

So that the manner in which the herein recited features of the present embodiments can be understood in detail, a more particular description of the embodiments may be had by reference to embodiments, some of which are illustrated in the appended drawings. It is to be noted, however, that the appended drawings illustrate only typical embodiments and are therefore not to be considered limiting of their scope.

FIG. 5A is a block diagram illustrating an exemplary instruction format according to embodiments.

FIG. 5B is a block diagram illustrating the fields of the instruction format that make up the full opcode field according to one embodiment.

FIG. 5C is a block diagram illustrating the fields of the instruction format that make up the register index field according to one embodiment.

FIG. 6 is a block diagram of a register architecture according to one embodiment.

DETAILED DESCRIPTION

Figures 1, 2:
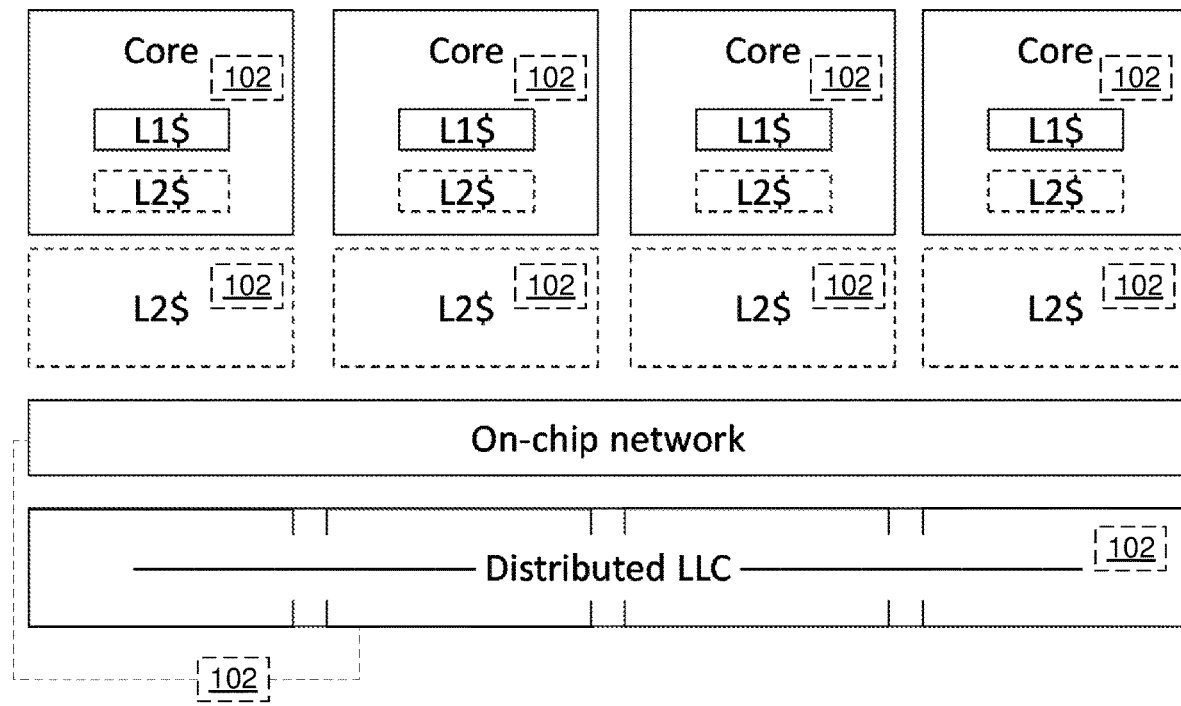
FIG. 1 illustrates a block diagram of a manycore processor with private cache level and a shared last-level cache, which may be utilized in some embodiments.
FIG. 2 illustrates a table with sample values for probability of remote-M cache hits, which may be present for some embodiments.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, in manycore processors running applications that have a large read/write shared data set, a significant amount of time may be lost waiting for cache coherency operations where a requesting core wants to fetch data that is held in a modified state in the cache of another core. Hence, a more time-efficient way of fetching such data could directly improve processor performance.

More particularly, some embodiments provide one or more delayed cache writeback instructions for improved data sharing in manycore processors. Such instructions allow a core to cause speculative write back of data, held in a modified state of a different core's cache, to a shared cache level, where it can be accessed by other cores more quickly. In at least one embodiment, the utilized instruction(s) follows the EVEX format (such as discussed with reference to FIGS. 5A-5C). However, embodiments are not limited to EVEX format and any instruction format may be used to implement various embodiments.

By contrast, several cache management instructions exist today that force writeback or eviction of modified data, such as clwb or cldemote in the x86 Instruction Set Architecture (ISA) such as provided by Intel® Corporation. In many cases, the future reuse pattern of a cache block cannot however be predicted with certainty. If a forced writeback or eviction instruction such as clwb or cldemote, is used in cases where the executing core would access the cache block in the near future, the writeback or eviction would have been unnecessary and would cause slowdown as the future access requires a second coherency transaction to obtain access to the cache block again. More fine-grained control is therefore needed for efficiency/performance purposes.

Further, some embodiments may be applied in computing systems that include one or more processors (e.g., where the one or more processors may include one or more processor cores), such as those discussed with reference to FIG. 1 et seq., including for example a desktop computer, a work station, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

In some embodiments, one or more instructions allow a dirty cache block (that is to be evicted in the near future) to be placed in the Last-Level Cache (LLC) where other cores can access it more quickly. This can avoid unnecessary slowdown (e.g., associated with waiting for cache coherency operations) when the probability of reuse by the initiating core is still high. As discussed herein, a "dirty" cache block generally refers to a cache block that is stale in memory (and the last-level cache) and its data has been modified; hence, since the copy in main memory and in the last-level cache is stale, any core requesting to read the latest version of the data needs an extra coherency round-trip (i.e., access the last-level cache as usual, which then realizes it does not have the latest copy and needs to request a write-back from a third-party core).

In various embodiments, the one or more instructions include: (a) clwb2llc.delayed to move the cache block in the Level 1 (L1) cache of a core to a special state (referred to herein as "M.wb" state or Modified writeback state), which when evicted from the L1 causes immediate writeback to the LLC (while keeping a clean copy (in shared state) in the local/private L2 cache); (b) clwb2llc.delayed.lru to act the same as clwb2llc.delayed but additionally move the block to Least Recently Used (LRU) state in the L1; (c) clwb2llc.now to trigger an immediate writeback of a dirty cache block to LLC, keeping a copy in shared state in the core's local/private cache; and/or (d) clwb2llc to act like any of the three previous instructions, depending on a register (or memory location) value, e.g., allowing its precise behavior to be specified at runtime using dynamic information.

As discussed herein, a cache "block" (or sometimes also referred to as a cache "sector") may include one or more cache lines. Hence, when discussing the proposed instructions herein, the actions may be applied to a cache line or a cache block interchangeably. Also, cache blocks/lines in "M.wb" state are treated the same as blocks/lines in the normal M state, except that when they are evicted from the L1, they are not left in modified state in the L2 (which would have the core retain exclusive ownership) but instead they are written directly to the LLC, keeping the updated copy in the L2 in shared state, see, e.g., FIG. 4.

Moreover, these instructions allow for more fine-grained control and avoidance of costly remote cache accesses, which are becoming more likely as the core count and cache capacity of future manycore processors keep growing. This can increase performance of important data-centric workloads. In an embodiment, all versions keep a shared (read-only) copy of the cache block in the private cache levels (e.g., L1 and/or L2) of the (initiating or local) core, allowing for fast future read operations. The delayed versions also allow for fast future writes. In all cases, future reads by other cores can be sped up as well.

FIG. 1 illustrates a block diagram of a manycore processor with private cache level and a shared last-level cache, which may be utilized in some embodiments. As shown, in a contemporary manycore processor chip, each core has a number of private cache levels (e.g., including a L1 and Level 2 (L2) cache levels (the L2 cache may sometimes be referred to as Mid-Level Cache (MLC)) which are kept coherent, and a shared last-level cache (LLC), which may be distributed amongst a plurality of cores. A cache may sometimes be designated with a dollar sign ($), such as shown in FIG. 1. Generally, cache coherence is managed at cache block/line granularity and implies that a cache block can be in a modified (M) state or an exclusive (E) state in the private cache hierarchy of just one core, or in a shared(S) state in one or more cores. Blocks in S state may only be read, while blocks in E or M state may be modified. When a core wants to read data that is in E or M state in another core, it first needs to request a writeback of the data, e.g., to the last-level cache. If the request is a read, the block can then be kept in the S state in both caches (optionally with a copy in the LLC as well). In an embodiment, the initial owning core does not keep the line in S, so the requesting core immediately gets the line in E state which is useful if it intends to write at some point after this first read. Also, as shown in FIG. 1, a core may include L1 cache, whereas L2 cache may straddle the boundary and be implemented as part of the core or outside the core (as indicated by the dashed boxes indicating the optional placement of L2 cache). LLC is located outside the core as shown in FIG. 1 and shared amongst a plurality of processor cores.

FIG. 2 illustrates a table with sample values for probability of remote-M cache hits, in occurrences per 1,000 instructions, for a sample data center workload, which may be present for some embodiments. As discussed herein, a "remote-M cache hit" or "remote-M hit" generally refers to hit caused by a request from a remote core. Also, a "cache hit" or "hit" generally refers to a situation where a cache finds a corresponding match for a data request in its structure.

Referring to FIG. 2, as both core count and cache capacities have been increasing historically, and are expected to continue doing so in future products, the probability of a core needing access to data that is held in E or M state in another core increases, see, e.g., FIG. 2 for measurements on a sample data center workload. At a rate of one remote-M hit per 1,000 instructions, for this workload running on a simulated 64-core system with SMT-2 (Simultaneous Multi-Threading with 2 hyper threads per core), the time spent waiting for remote cores to write back their data can reach up to about 10% of total runtime—showing that the problem is significant, and about to get worse.

Moreover, if an instruction can be identified that last writes to a cache block before it is needed by another core, a cache management instruction can be added just after this instruction to write the data back to the last-level cache, such that other cores can access it much more quickly. In some cases, such as synchronization variables, these instructions are easily identified by the programmer, compiler or profiling tool and it can be established that every execution of this instruction is indeed followed by a remote-M hit from another core. In these cases, inserting a cache management instruction that immediately triggers a writeback of the cache block to LLC can significantly increase performance without harmful side effects.

However, in most cases, instructions that are the last producer before a remote-M hit can only be identified probabilistically, i.e., in some fraction of dynamic executions the instruction is indeed the last producer, but other executions of the same instruction are followed by reuse by the same core. In those cases, forcing a writeback degrades performance as now two additional coherence transactions, the writeback and a new arbitration for exclusive access to transition the cache block from S back to E/M, are needed. In fact, for the data center application from FIG. 2, only about 2% of the instructions that preceded remote-M hits would not also have a significant fraction of cases where the cache block was reused locally, so blindly inserting forced evictions to avoid all remote-M hits can severely degrades performance.

Figure 3A:
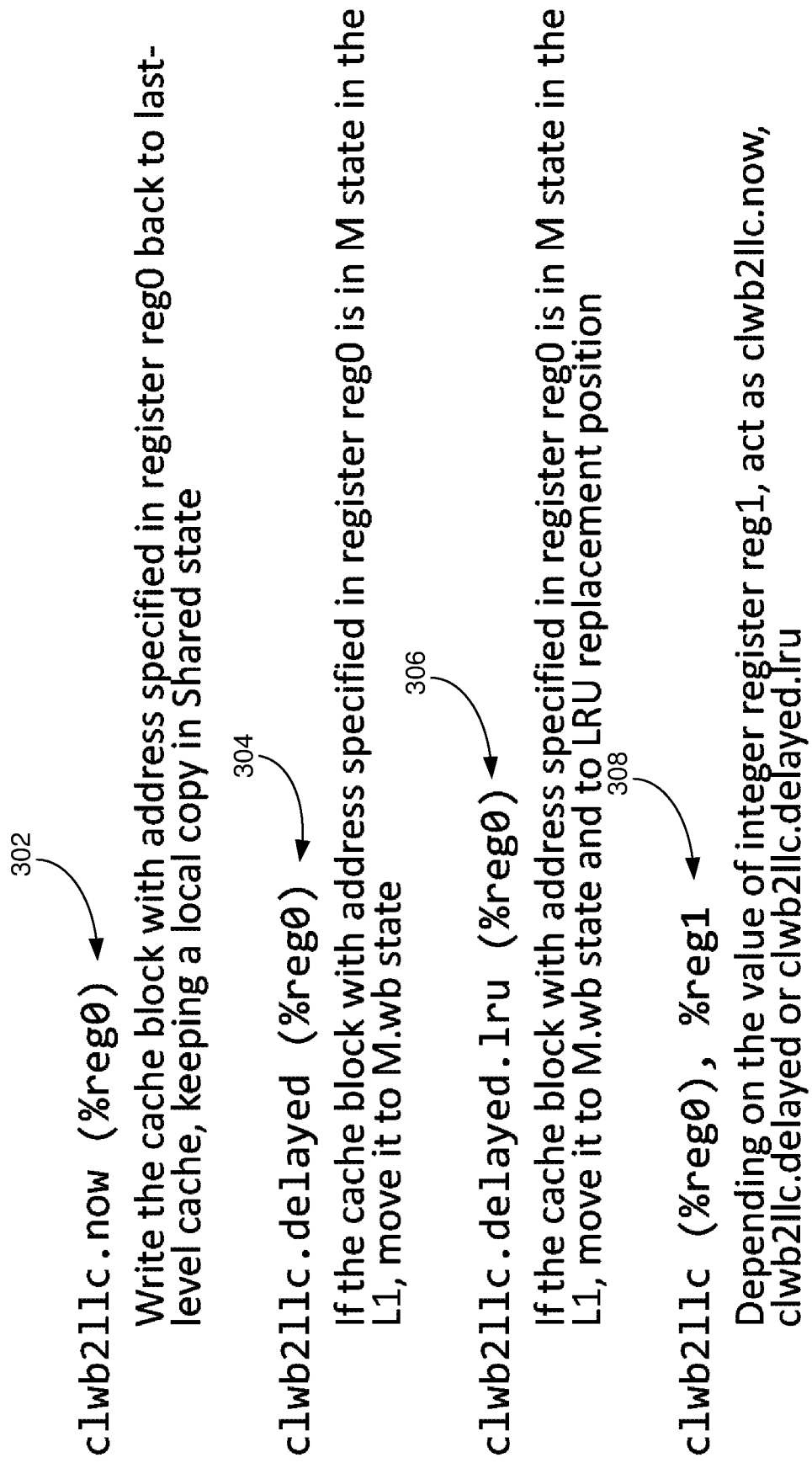
FIG. 3A illustrates four instructions, according to some embodiments.
Figure 3B:
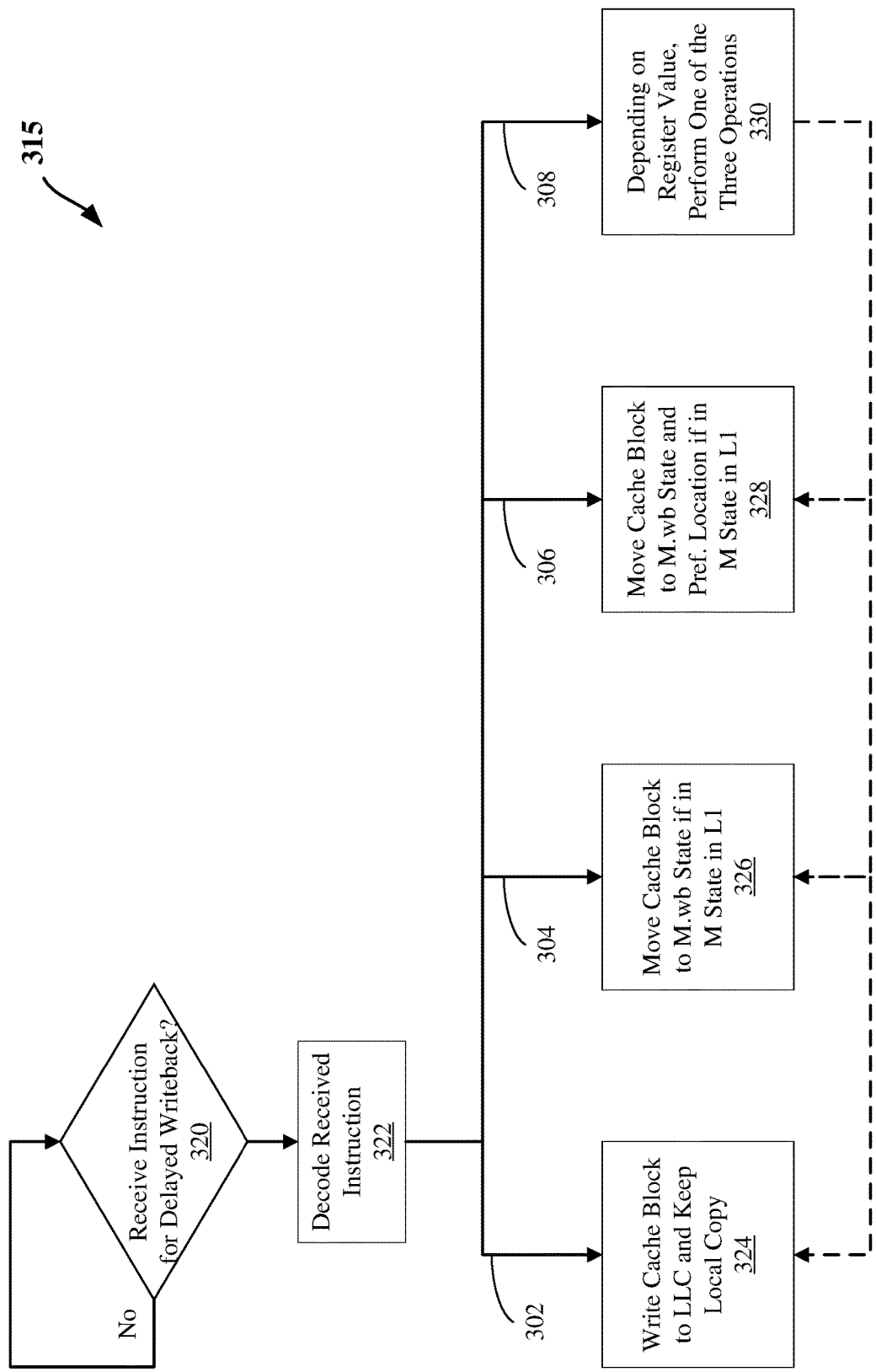
FIG. 3B illustrates sample flow diagram for the four instructions of FIG. 3A, according to some embodiments.

FIG. 3A illustrates four proposed instruction variants, according to some embodiments. FIG. 3B illustrates sample flow diagram to perform a method 315 for the four instructions of FIG. 3A, according to some embodiments. To accommodate the aforementioned case where an instruction precedes a remote-M hit with some probability but accesses a cache block that will be reused by the same core with another probability, three instructions 302/304/306 are proposed that can strike a more fine-grained balance between the potential savings of a future remote-M hit, and the potential cost of re-acquiring ownership of the cache block if it is reused by the same core. Each instruction may include one or more opcodes such as those discussed with reference to FIG. 7A et seq.

Referring to FIGS. 3A and 3B, operation 320 determines whether a delayed writeback instruction (such as any of instructions 302-308 has been received). Operation 322 decodes the received instruction (e.g., using a decode logic such as decode stage(s) discussed with reference to FIG. 7A et seq.) and determines which one of the instructions is present. In turn, operations 324-330 perform tasks associated with the decoded instruction. Moreover, each instruction 302-308 takes one argument (e.g., % reg0) that identifies a memory address, e.g., at cache block/line granularity. Since these instructions only affect cache behavior, but not architectural state, they may be safely ignored or treated as a no-op by implementations that choose not to support them. They could also be ignored, without triggering faults, if the address passed to them is invalid or falls into an uncacheable address range. The three instructions' (302-306) behaviors can also be combined into one instruction (308) where the behavior is specified by an additional argument (e.g., % reg1), allowing its effect to be controlled at runtime using dynamic information that is not available at compile time.

The clwb2llc.now instruction 302 writes back the cache block/line to LLC immediately, leaving a shared copy in the private/local cache (e.g., L1 cache and/or L2 cache, or more levels of private cache levels in addition to LLC) of the executing core. This instruction can be used for those cases where read access is still expected by the executing core, so a cldemote or clflush which do not keep a read-only copy are inappropriate, but where future write access by the same core can still be ruled out with high probability. The instruction is also different from the existing clwb which writes the cache block out to main memory, in contrast clwb2llc.now leaves the data in the LLC as modified/dirty without writing to main memory-which on a workload with heavy but ephemeral write traffic (e.g., synchronization variables or other inter-process communication with a producer-consumer relation) can save significant main memory write bandwidth and/or power (which can be especially important for non-volatile main memory technologies where writes are much more expensive than for Dynamic Random Access Memory (DRAM)). With respect to leaving the data in the LLC as modified/dirty, there can be multiple copies of a cache block/line in different private hierarchies (all in S state); but the value in main memory is stale. Hence the line is kept in M state in the LLC so an LLC eviction will write back the latest value to main memory. In some implementations such as multi-socket system, there can be multiple LLCs that perform a second level of coherency among themselves, so an M state in LLC refers to this second-level coherency protocol.

The clwb2llc.delayed 304 instruction is meant for cases where future writes by the executing core are likely. Rather than immediately writing back the cache block and relinquishing exclusive ownership, the block/line is moved to a dedicated M.wb state in the L1. This is assuming the block/line was in M state once this instruction executes; otherwise, the instruction has no effect. Cache blocks/lines in M.wb state are treated the same as blocks/lines in the normal M state, except that when they are evicted by the L1, they are not left in modified state in the L2 (which would have the core retain exclusive ownership) but instead they are written straight to the LLC, keeping the updated copy in the L2 in a shared state, see, e.g., operation 410 of FIG. 4. This way, if the same core writes to the cache block again soon after the execution of the clwb2llc.delayed instruction, but before eviction from the L1, the cache block will still be found in the L1 in the M.wb state which means the core still has an exclusive copy and is allowed to make further modifications-negating the need for a new request for ownership.

The clwb2llc.delayed.lru instruction 306 acts the same as clwb2llc.delayed, but in addition moves the block/line into a replacement position in the L1 so it is preferentially selected for replacement (e.g., LRU, pseudo LRU, Not Recently Used (NRU), etc.). In at least one embodiments, this instruction consists of a useful middle ground between clwb2llc.now, which performs the writeback immediately, and clwb2llc.delayed which may delay the writeback for too long (until after a remote core needs the data, which would trigger the slower remote-M hit).

As previously mentioned, the clwb2llc instruction 308 can act like any of the three previous instructions 302, 304, or 306, depending on a register (or memory location) value allowing its precise behavior to be specified at runtime using dynamic information.

Figure 4:
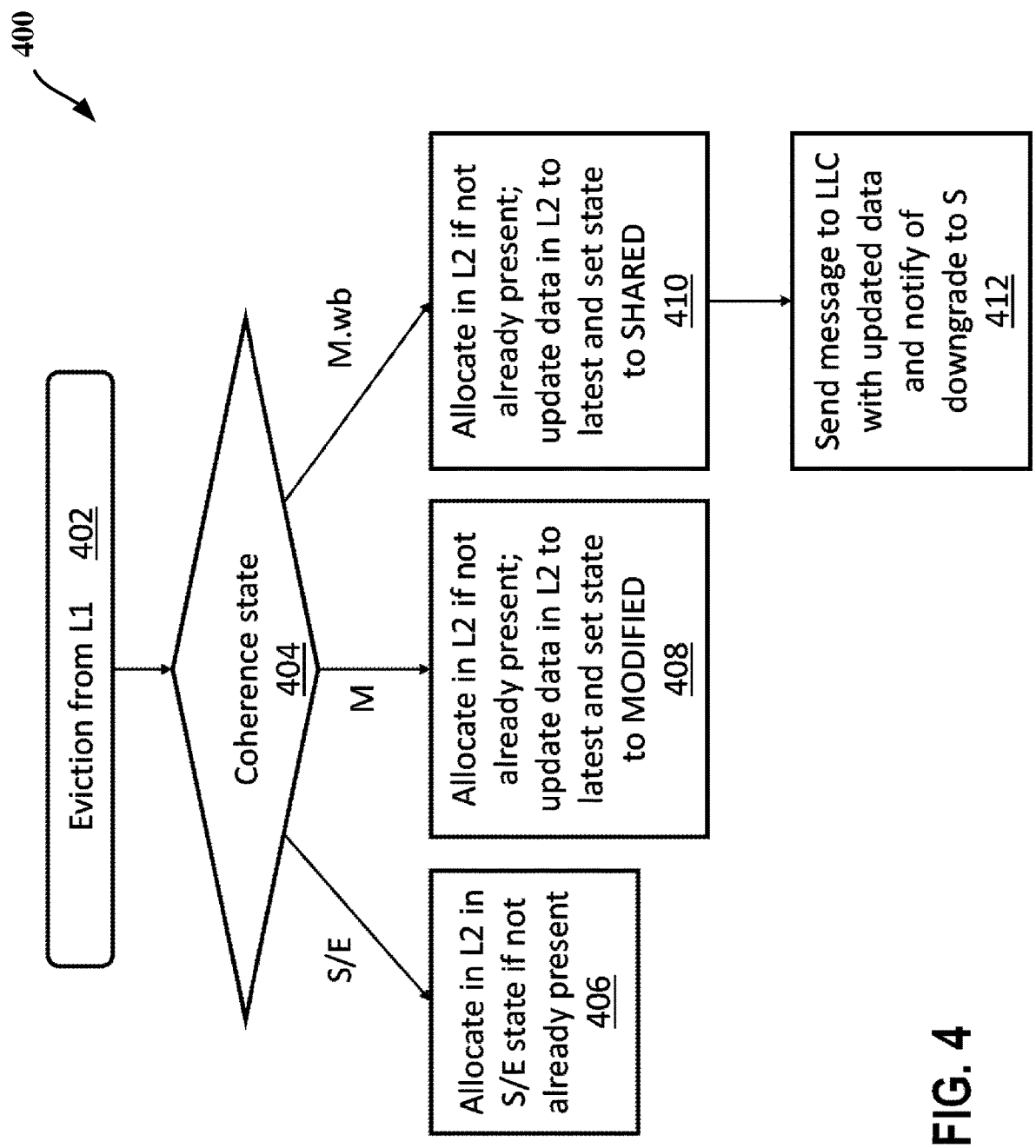
FIG. 4 illustrates a flow diagram of a method to evict data from a level 1 cache, according to an embodiment.

FIG. 4 illustrates a flow diagram of a method 400 to evict data from a level 1 cache, according to an embodiment. Upon detection of an eviction request from L1 at operation 402, operation 404 determines the coherence state of the requested data (e.g., corresponding cache block or line). If the state is S or E, operation 406 allocates the data in states S or E, respectively in L2, if not already present. If the coherence state is M, operation 408 allocates the data in L2 if not already present and updates the L2 data to the latest version of the data and sets its state to M. If the coherence state is M.wb, operation 410 allocates the data in L2 if not already present and updates the data in L2 to the latest version the data and sets its state to S. After operation 410, operation 412 sends a message to the LLC with the updated data and notifies the downgrade of the state to S.

In some embodiments, one or more new performance counters 102 may be used as follows. As shown in FIG. 1, the performance counters 102 may be implemented in various locations in a processor (as indicated by a dashed box), including for example, a processor core, in L1, L2, LLC, or otherwise couple to the interconnects on a processor, and so on.

(1) REMOTE_HIT™_ON_DELAYED_WB counts the number of remote-M hits on lines that are in the M.wb state of the core's L1, i.e., lines on which a delayed clwb2llc variant was used but which have not yet been written back. A high value of this counter indicates that use of clwb2llc.now may be more appropriate.

(2) LOCAL_HIT_ON_DELAYED_WB counts the number of local write hits on lines in M.wb state. A "local" write generally refers to a write operation to a cache by its local core. A high value of this counter indicates reuse of lines marked by clwb2llc.delayed or clwb2llc.delayed.lru, indicating that the clwb2llc instructions are being employed too aggressively.

Hence, these performance counters allow application software or profiling tools to measure the behavior of cache blocks after they were targeted by a clwb2llc.delayed instruction. This information can be used to make the writeback strategy more or less aggressive as needed.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source 1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 6 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

FIG. 5A is a block diagram illustrating an exemplary instruction format according to embodiments. FIG. 5A shows an instruction format 500 that is specific in the sense that it specifies the location, size, interpretation, and order of the fields, as well as values for some of those fields. The instruction format 500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions.

EVEX Prefix (Bytes 0-3) 502—is encoded in a four-byte form.

Format Field 582 (EVEX Byte 0, bits [7:0])—the first byte (EVEX Byte 0) is the format field 582 and it contains 0x62 (the unique value used for distinguishing the vector friendly instruction format in one embodiment).

The second-fourth bytes (EVEX Bytes 1-3) include a number of bit fields providing specific capability.

REX field 505 (EVEX Byte 1, bits [7-5])—consists of a EVEX.R bit field (EVEX Byte 1, bit [7]-R), EVEX.X bit field (EVEX byte 1, bit [6]-X), and EVEX.B bit field (EVEX byte 1, bit [5]-B). The EVEX.R, EVEX.X, and EVEX.B bit fields provide the same functionality as the corresponding VEX bit fields, and are encoded using 1s complement form, i.e. ZMM0 is encoded as 911B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 510—this is the EVEX.R' bit field (EVEX Byte 1, bit [4]-R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 9 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 515 (EVEX byte 1, bits [3:0]-mmmm)-its content encodes an implied leading opcode byte (0F, 0F 38, or 0F 3).

Data element width field 564 (EVEX byte 2, bit [7]-W)—is represented by the notation EVEX.W. EVEX.W is used to define the granularity (size) of the datatype (either 32-bit data elements or 64-bit data elements). This field is optional in the sense that it is not needed if only one data element width is supported and/or data element widths are supported using some aspect of the opcodes.

EVEX. vvvv 520 (EVEX Byte 2, bits [6:3]-vvvv)—the role of EVEX. vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 911b. Thus, EVEX. vvvv field 520 encodes the 4 low-order bits of the first source register specifier stored in inverted (1s complement) form. Depending on the instruction, an extra different EVEX bit field is used to extend the specifier size to 32 registers.

EVEX.U 568 Class field (EVEX byte 2, bit [2]-U)-If EVEX.U=0, it indicates class A (support merging-writemasking) or EVEX.U0; if EVEX.U=1, it indicates class B (support zeroing and merging-writemasking) or EVEX.U1.

Prefix encoding field 525 (EVEX byte 2, bits [1:0]-pp)-provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 553 (EVEX byte 3, bit [7]-EH; also known as EVEX.EH, EVEX.rs, EVEX.RL, EVEX.writemask control, and EVEX.N; also illustrated with α)—its content distinguishes which one of the different augmentation operation types are to be performed.

Beta field 555 (EVEX byte 3, bits [6:4]-SSS, also known as EVEX.s2-0, EVEX.r2-0, EVEX.rr1, EVEX.LL0, EVEX.LLB; also illustrated with βββ)—distinguishes which of the operations of a specified type are to be performed.

REX' field 510—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Writemask field 571 (EVEX byte 3, bits [2:0]-kkk)-its content specifies the index of a register in the writemask registers. In one embodiment, the specific value EVEX.kkk=000 has a special behavior implying no writemask is used for the particular instruction (this may be implemented in a variety of ways including the use of a writemask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the writemask field 571 allows for partial vector operations, including loads, stores, arithmetic, logical, etc. While embodiments are described in which the writemask field's 571 content selects one of a number of writemask registers that contains the writemask to be used (and thus the writemask field's 571 content indirectly identifies that masking to be performed), alternative embodiments instead or additional allow the mask write field's 571 content to directly specify the masking to be performed.

Real Opcode Field 530 (Byte 4) is also known as the opcode byte. Part of the opcode is specified in this field.

MOD R/M Field 540 (Byte 5) includes MOD field 542, register index field 544, and R/M field 546. The MOD field's 542 content distinguishes between memory access and non-memory access operations. The role of register index field 544 can be summarized to two situations: encoding either the destination register operand or a source register operand, or be treated as an opcode extension and not used to encode any instruction operand. The content of register index field 544, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

The role of R/M field 546 may include the following: encoding the instruction operand that references a memory address, or encoding either the destination register operand or a source register operand.

Scale, Index, Base (SIB) Byte (Byte 6)—The scale field's 550 content allows for the scaling of the index field's content for memory address generation (e.g., for address generation that uses 2scale*index+base). SIB.xxx 554 and SIB.bbb 556—the contents of these fields have been previously referred to with regard to the register indexes Xxxx and Bbbb.

Displacement field 563A (Bytes 5-10)—when MOD field 542 contains 10, 8, bytes 5-10 are the displacement field 563A, and it works the same as the legacy 32-bit displacement (disp32) and works at byte granularity. This may be used as part of memory address generation (e.g., for address generation that uses 2scale*index+base+displacement).

Displacement factor field 563B (Byte 5)—when MOD field 542 contains 01, byte 5 is the displacement factor field 563B. The location of this field is that same as that of the legacy x86 instruction set 8-bit displacement (disp8), which works at byte granularity. Since disp8 is sign extended, it can only address between-128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 563B is a reinterpretation of disp8; when using displacement factor field 563B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 563B substitutes the legacy x86 instruction set 8-bit displacement. Thus, the displacement factor field 563B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 572 allows for the specification of an immediate. This field is optional in the sense that is it not present in an implementation of the generic vector friendly format that does not support immediate and it is not present in instructions that do not use an immediate.

Full Opcode Field

FIG. 5B is a block diagram illustrating the fields of the instruction format 500 that make up the full opcode field 574 according to one embodiment. Specifically, the full opcode field 574 includes the format field 582, the base operation field 543, and the data element width (W) field 564. The base operation field 543 includes the prefix encoding field 525, the opcode map field 515, and the real opcode field 530.

Register Index Field

FIG. 5C is a block diagram illustrating the fields of the format 500 that make up the register index field 545 according to one embodiment. Specifically, the register index field 545 includes the REX field 505, the REX' field 510, the MODR/M.reg field 544, the MODR/M.r/m field 546, the VVVV field 520, xxx field 554, and the bbb field 556.

Augmentation Operation Field

Figure 5D:
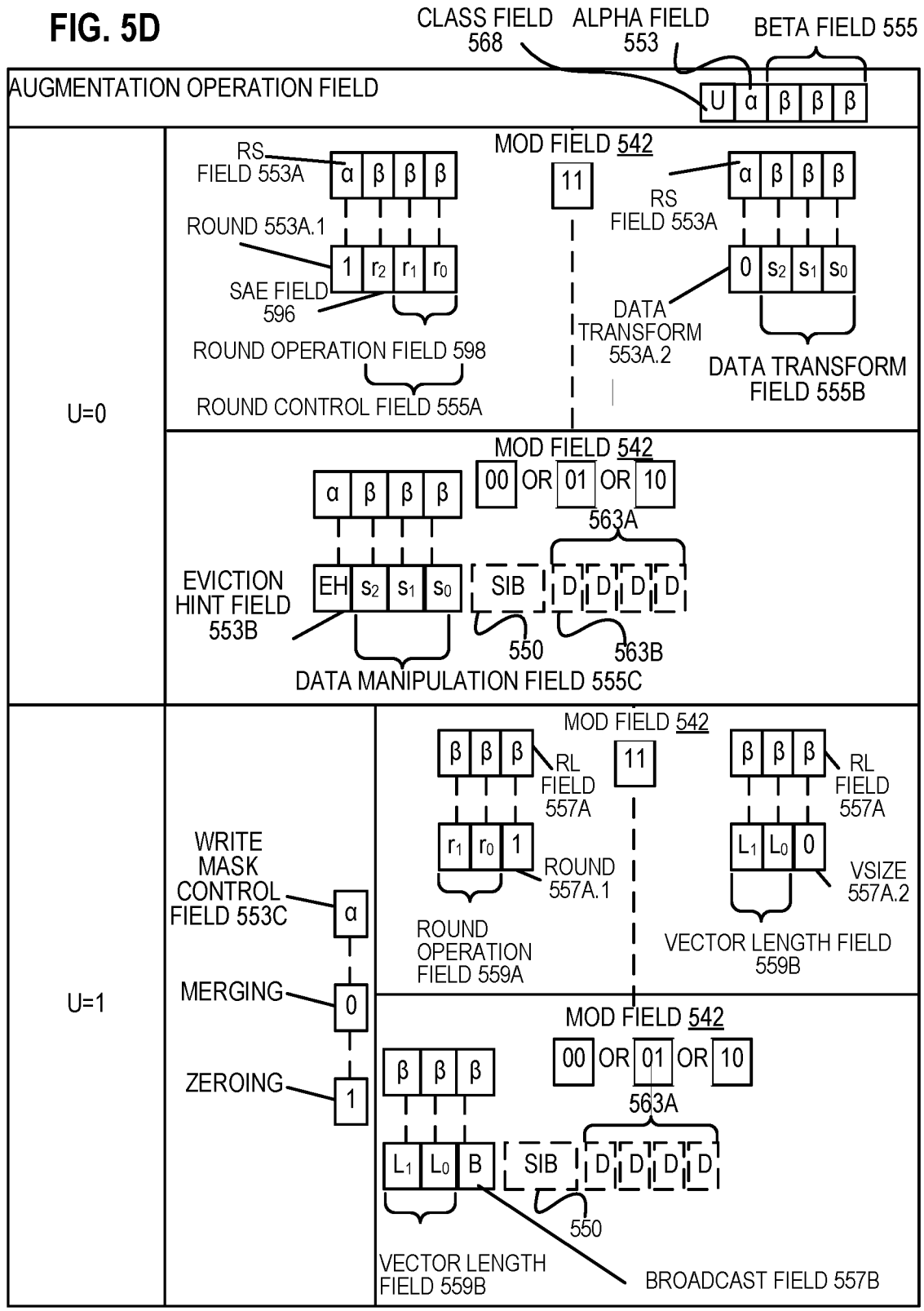
FIG. 5D is a block diagram illustrating the fields of the instruction format that make up the augmentation operation field according to one embodiment.

FIG. 5D is a block diagram illustrating the fields of the instruction format 500 that make up an augmentation operation field according to one embodiment. When the class (U) field 568 contains 0, it signifies EVEX.U0 (class A 568A); when it contains 1, it signifies EVEX.U1 (class B 568B). When U=0 and the MOD field 542 contains [9] 11 (signifying a no memory access operation), the alpha field 553 (EVEX byte 3, bit [7]-EH) is interpreted as the rs field 553A. When the rs field 553A contains a 1 (round 553A.1), the beta field 555 (EVEX byte 3, bits [6:4]-SSS) is interpreted as the round control field 555A. The round control field 555A includes a one bit SAE field 596 and a two bit round operation field 598. When the rs field 553A contains a 0 (data transform 553A.2), the beta field 555 (EVEX byte 3, bits [6:4]-SSS) is interpreted as a three bit data transform field 555B. When U=0 and the MOD field 542 contains 00, 01, or 10 (signifying a memory access operation), the alpha field 553 (EVEX byte 3, bit [7]-EH) is interpreted as the eviction hint (EH) field 553B and the beta field 555 (EVEX byte 3, bits [6:4]-SSS) is interpreted as a three bit data manipulation field 555C.

When U=1, the alpha field 553 (EVEX byte 3, bit [7]-EH) is interpreted as the writemask control (Z) field 553C. When U=1 and the MOD field 542 contains 11 (signifying a no memory access operation), part of the beta field 555 (EVEX byte 3, bit [4]-S0) is interpreted as the RL field 557A; when it contains a 1 (round 557A.1) the rest of the beta field 555 (EVEX byte 3, bit [6-5]-S2-1) is interpreted as the round operation field 559A, while when the RL field 557A contains a 0 (VSIZE 557.A2) the rest of the beta field 555 (EVEX byte 3, bit [6-5]-S2-1) is interpreted as the vector length field 559B (EVEX byte 3, bit [6-5]-L1-0). When U=1 and the MOD field 542 contains 00, 01, or 10 (signifying a memory access operation), the beta field 555 (EVEX byte 3, bits [6:4]-SSS) is interpreted as the vector length field 559B (EVEX byte 3, bit [6-5]-L1-0) and the broadcast field 557B (EVEX byte 3, bit [4]-B).

Exemplary Register Architecture

FIG. 6 is a block diagram of a register architecture 600 according to one embodiment. In the embodiment illustrated, there are 32 vector registers 610 that are 512 bits wide; these registers are referenced as ZMM0 through ZMM31. The lower order 256 bits of the lower 16 ZMM registers are overlaid on registers YMM0-15. The lower order 128 bits of the lower 16 ZMM registers (the lower order 128 bits of the YMM registers) are overlaid on registers XMM0-15. In other words, the vector length field 559B selects between a maximum length and one or more other shorter lengths, where each such shorter length is half the length of the preceding length; and instructions templates without the vector length field 559B operate on the maximum vector length. Further, in one embodiment, the class B instruction templates of the instruction format 500 operate on packed or scalar single/double-precision floating point data and packed or scalar integer data. Scalar operations are operations performed on the lowest order data element position in a ZMM/YMM/XMM register; the higher order data element positions are either left the same as they were prior to the instruction or zeroed depending on the embodiment.

Writemask registers 615—in the embodiment illustrated, there are 8 writemask registers (k0 through k7), each 64 bits in size. In an alternate embodiment, the writemask registers 615 are 16 bits in size. In some embodiments, the vector mask register k0 cannot be used as a writemask; when the encoding that would normally indicate k0 is used for a writemask, it selects a hardwired writemask of 0xFFFF, effectively disabling writemasking for that instruction.

General-purpose registers 625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 645, on which is aliased the MMX packed integer flat register file 650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU;

2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

Figure 7:
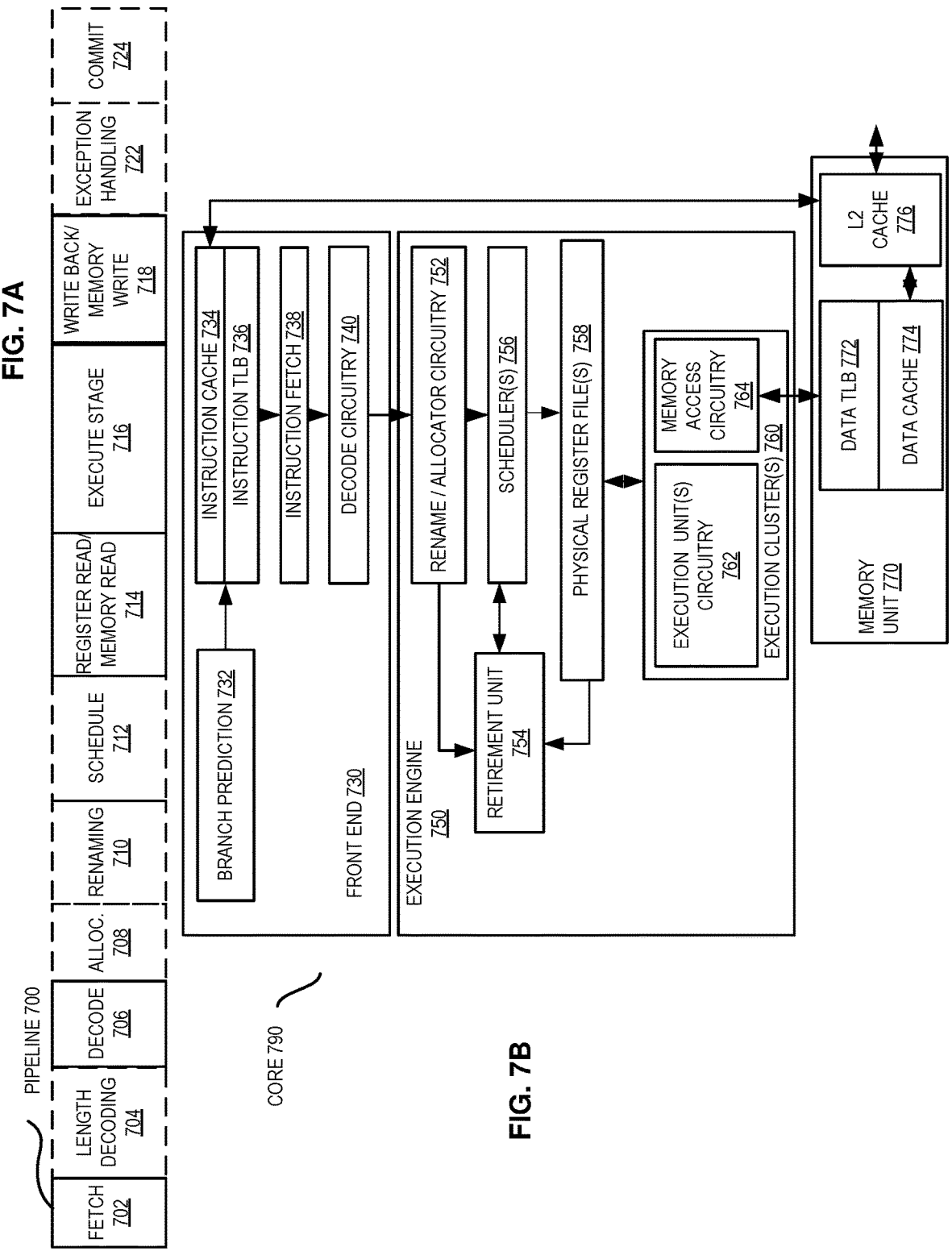
FIG. 7A is a block diagram illustrating both an exemplary in-order pipeline and an exemplary register renaming, out-of-order issue/execution pipeline according to embodiments.
FIG. 7B is a block diagram illustrating both an exemplary embodiment of an in-order architecture core and an exemplary register renaming, out-of-order issue/execution architecture core to be included in a processor according to embodiments.

FIG. 7A is a block diagram illustrating both an exemplary in-order pipeline and an exemplary register renaming, out-of-order issue/execution pipeline according to embodiments. FIG. 7B is a block diagram illustrating both an exemplary embodiment of an in-order architecture core and an exemplary register renaming, out-of-order issue/execution architecture core to be included in a processor according to embodiments. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a writemask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

Figure 8:
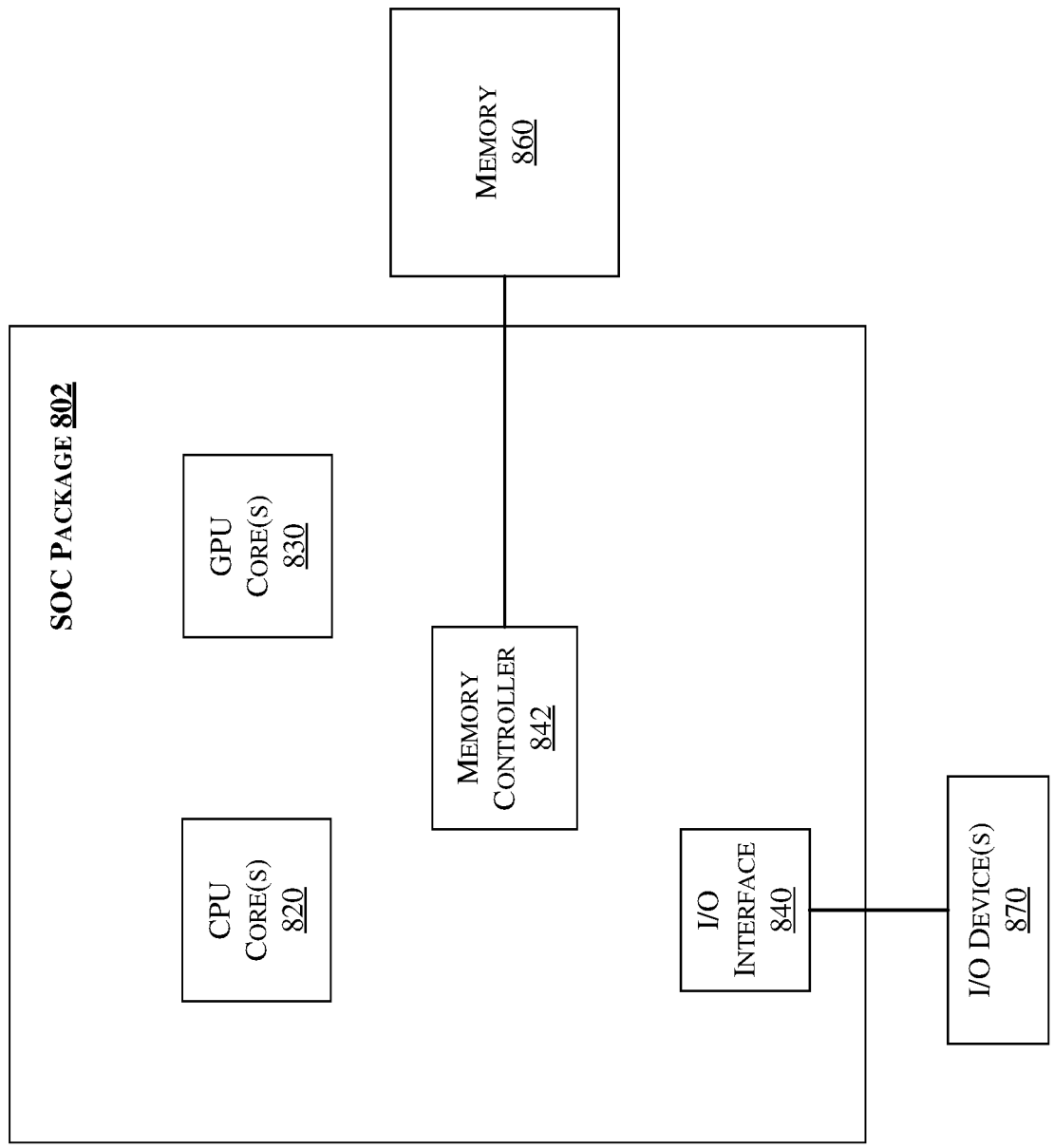
FIG. 8 illustrates a block diagram of an SOC (System On Chip) package in accordance with an embodiment.

FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 802 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like.

Figure 9:
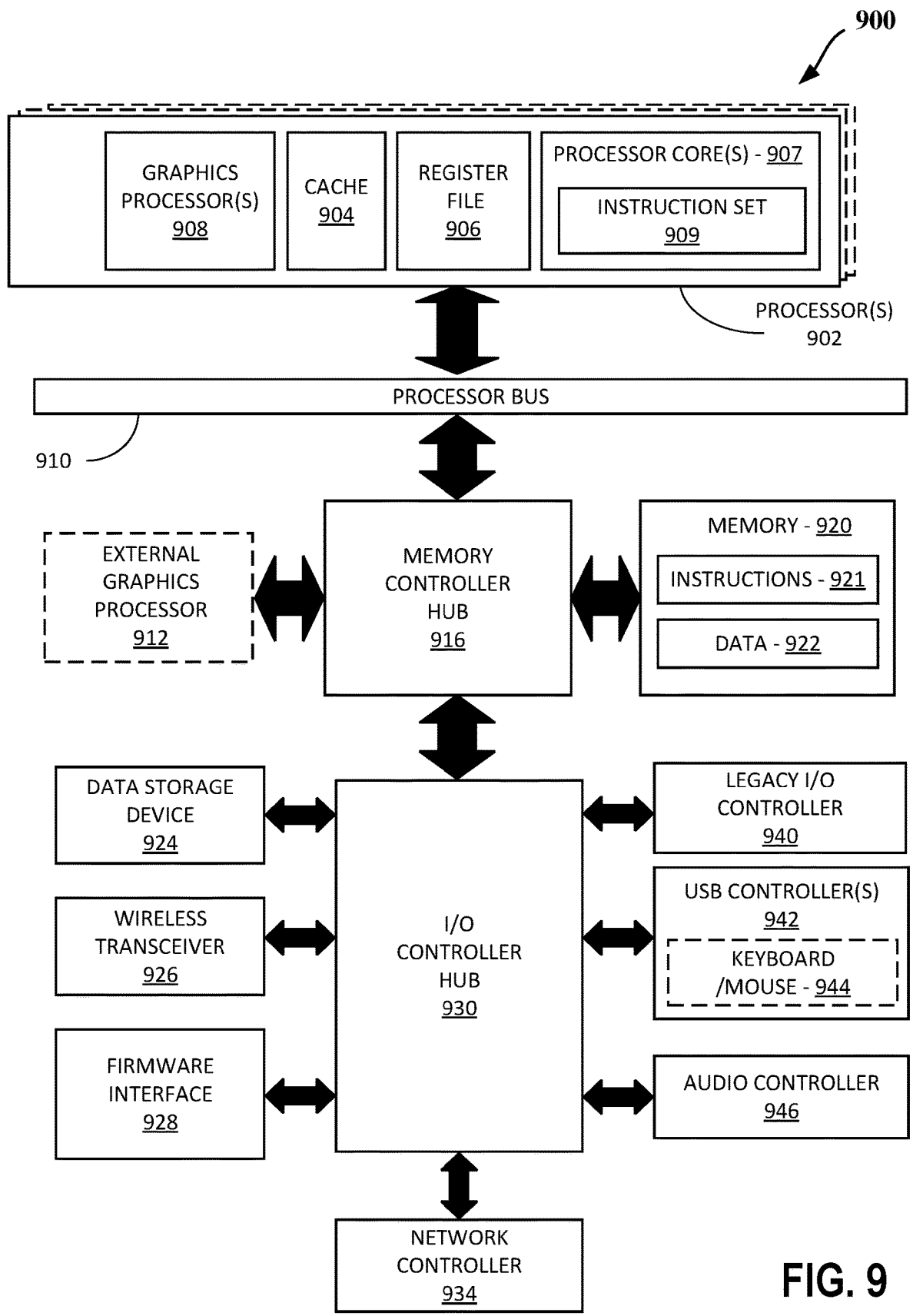
FIG. 9 is a block diagram of a processing system, according to an embodiment.

FIG. 9 is a block diagram of a processing system 900, according to an embodiment. In various embodiments the system 900 includes one or more processors 902 and one or more graphics processors 908, and may be a single processor desktop system, a multiprocessor workstation system, or a server system having a large number of processors 902 or processor cores 907. In on embodiment, the system 900 is a processing platform incorporated within a system-on-a-chip (SoC or SOC) integrated circuit for use in mobile, handheld, or embedded devices.

An embodiment of system 900 can include, or be incorporated within a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled to a processor bus 910 to transmit communication signals such as address, data, or control signals between processor 902 and other components in system 900. In one embodiment the system 900 uses an exemplary 'hub' system architecture, including a memory controller hub 916 and an Input Output (I/O) controller hub 930. A memory controller hub 916 facilitates communication between a memory device and other components of system 900, while an I/O Controller Hub (ICH) 930 provides connections to I/O devices via a local I/O bus. In one embodiment, the logic of the memory controller hub 916 is integrated within the processor.

Memory device 920 can be a dynamic random access memory (DRAM) device, a static random access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 executes an application or process. Memory controller hub 916 also couples with an optional external graphics processor 912, which may communicate with the one or more graphics processors 908 in processors 902 to perform graphics and media operations.

In some embodiments, ICH 930 enables peripherals to connect to memory device 920 and processor 902 via a high-speed I/O bus. The I/O peripherals include, but are not limited to, an audio controller 946, a firmware interface 928, a wireless transceiver 926 (e.g., Wi-Fi, Bluetooth), a data storage device 924 (e.g., hard disk drive, flash memory, etc.), and a legacy I/O controller 940 for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples to processor bus 910. It will be appreciated that the system 900 shown is exemplary and not limiting, as other types of data processing systems that are differently configured may also be used. For example, the I/O controller hub 930 may be integrated within the one or more processor 902, or the memory controller hub 916 and I/O controller hub 930 may be integrated into a discreet external graphics processor, such as the external graphics processor 912.

Figure 10:
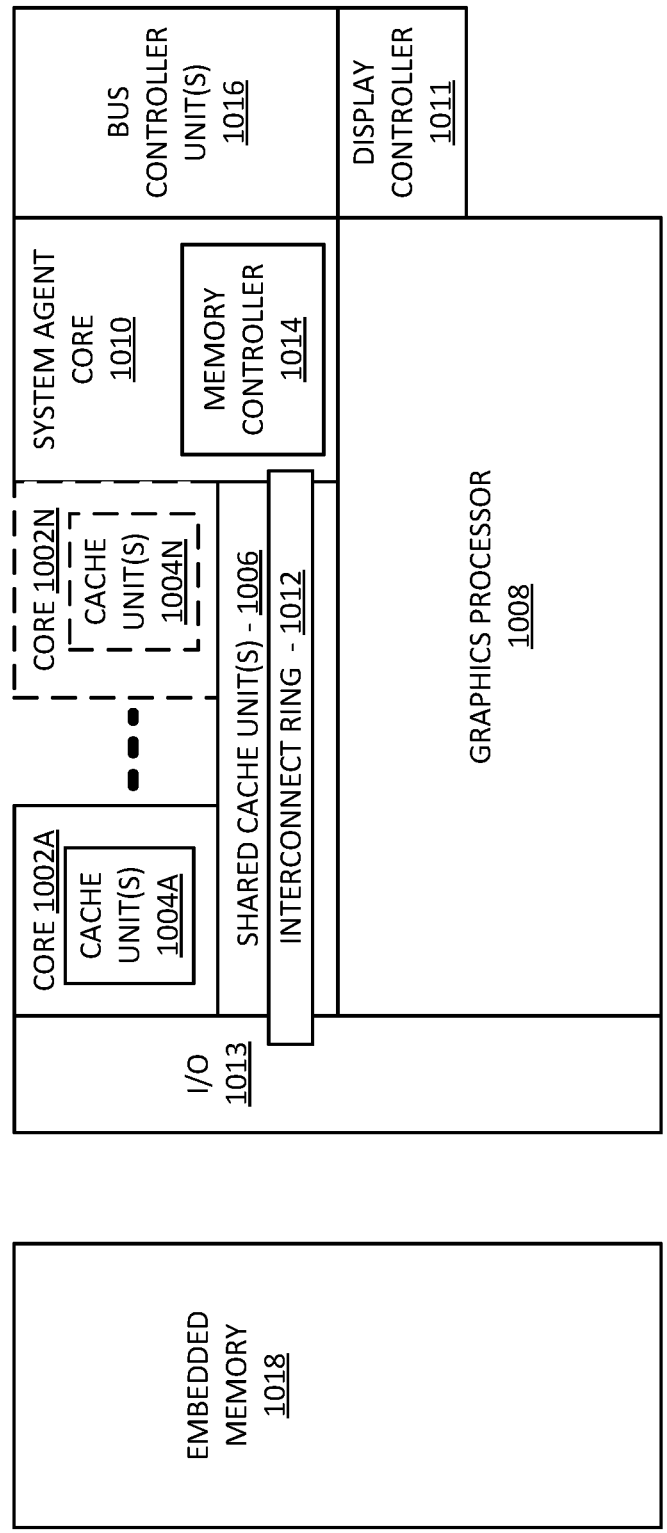
FIG. 10 is a block diagram of an embodiment of a processor having one or more processor cores, according to some embodiments.

FIG. 10 is a block diagram of an embodiment of a processor 1000 having one or more processor cores 1002A to 1002N, an integrated memory controller 1014, and an integrated graphics processor 1008. Those elements of FIG. 10 having the same reference numbers (or names) as the elements of any other figure herein can operate or function in any manner similar to that described elsewhere herein, but are not limited to such. Processor 1000 can include additional cores up to and including additional core 1002N represented by the dashed lined boxes. Each of processor cores 1002A to 1002N includes one or more internal cache units 1004A to 1004N. In some embodiments each processor core also has access to one or more shared cached units 1006.

The internal cache units 1004A to 1004N and shared cache units 1006 represent a cache memory hierarchy within the processor 1000. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1006 and 1004A to 1004N.

In some embodiments, processor 1000 may also include a set of one or more bus controller units 1016 and a system agent core 1010. The one or more bus controller units 1016 manage a set of peripheral buses, such as one or more Peripheral Component Interconnect buses (e.g., PCI, PCI Express). System agent core 1010 provides management functionality for the various processor components. In some embodiments, system agent core 1010 includes one or more integrated memory controllers 1014 to manage access to various external memory devices (not shown).

In some embodiments, one or more of the processor cores 1002A to 1002N include support for simultaneous multi-threading. In such embodiment, the system agent core 1010 includes components for coordinating and operating cores 1002A to 1002N during multi-threaded processing. System agent core 1010 may additionally include a power control unit (PCU), which includes logic and components to regulate the power state of processor cores 1002A to 1002N and graphics processor 1008.

In some embodiments, processor 1000 additionally includes graphics processor 1008 to execute graphics processing operations. In some embodiments, the graphics processor 1008 couples with the set of shared cache units 1006, and the system agent core 1010, including the one or more integrated memory controllers 1014. In some embodiments, a display controller 1011 is coupled with the graphics processor 1008 to drive graphics processor output to one or more coupled displays. In some embodiments, display controller 1011 may be a separate module coupled with the graphics processor via at least one interconnect, or may be integrated within the graphics processor 1008 or system agent core 1010.

In some embodiments, a ring based interconnect unit 1012 is used to couple the internal components of the processor 1000. However, an alternative interconnect unit may be used, such as a point-to-point interconnect, a switched interconnect, or other techniques, including techniques well known in the art. In some embodiments, graphics processor 1008 couples with the ring interconnect 1012 via an I/O link 1013.

The exemplary I/O link 1013 represents at least one of multiple varieties of I/O interconnects, including an on package I/O interconnect which facilitates communication between various processor components and a high-performance embedded memory module 1018, such as an eDRAM (or embedded DRAM) module.

In some embodiments, each of the processor cores 1002 to 1002N and graphics processor 1008 use embedded memory modules 1018 as a shared Last Level Cache.

In some embodiments, processor cores 1002A to 1002N are homogenous cores executing the same instruction set architecture. In another embodiment, processor cores 1002A to 1002N are heterogeneous in terms of instruction set architecture (ISA), where one or more of processor cores 1002A to 1002N execute a first instruction set, while at least one of the other cores executes a subset of the first instruction set or a different instruction set. In one embodiment processor cores 1002A to 1002N are heterogeneous in terms of microarchitecture, where one or more cores having a relatively higher power consumption couple with one or more power cores having a lower power consumption. Additionally, processor 1000 can be implemented on one or more chips or as an SoC integrated circuit having the illustrated components, in addition to other components.

Figure 11:
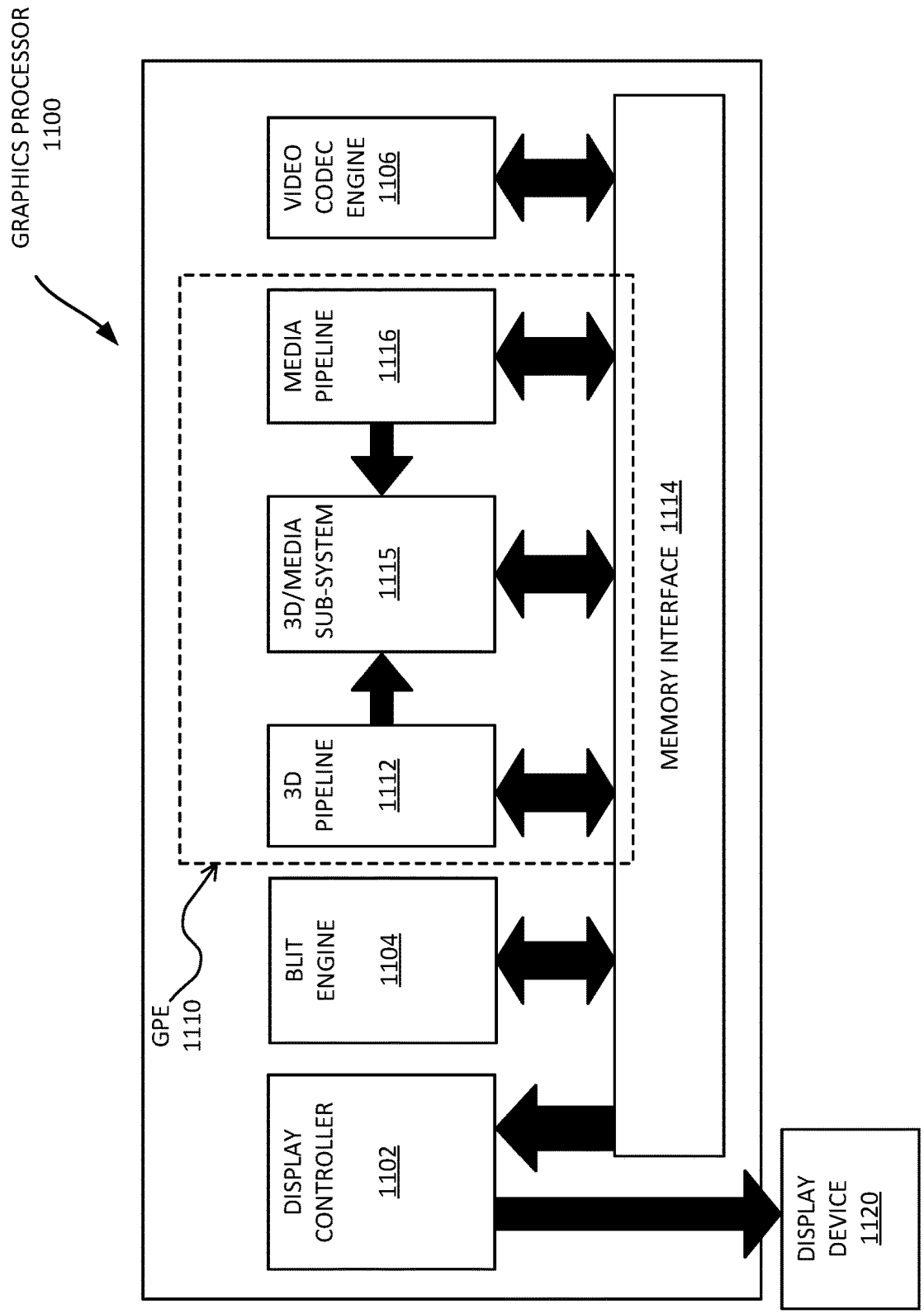
FIG. 11 is a block diagram of a graphics processor, according to an embodiment.

FIG. 11 is a block diagram of a graphics processor 1100, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1100 includes a memory interface 1114 to access memory. Memory interface 1114 can be an interface to local memory, one or more internal caches, one or more shared external caches, and/or to system memory.

In some embodiments, graphics processor 1100 also includes a display controller 1102 to drive display output data to a display device 1120. Display controller 1102 includes hardware for one or more overlay planes for the display and composition of multiple layers of video or user interface elements. In some embodiments, graphics processor 1100 includes a video codec engine 1106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 1100 includes a block image transfer (BLIT) engine 1104 to perform two-dimensional (2D) rasterizer operations including, for example, bit-boundary block transfers. However, in one embodiment, 2D graphics operations are performed using one or more components of graphics processing engine (GPE) 1110. In some embodiments, graphics processing engine 1110 is a compute engine for performing graphics operations, including three-dimensional (3D) graphics operations and media operations.

In some embodiments, GPE 1110 includes a 3D pipeline 1112 for performing 3D operations, such as rendering three-dimensional images and scenes using processing functions that act upon 3D primitive shapes (e.g., rectangle, triangle, etc.). The 3D pipeline 1112 includes programmable and fixed function elements that perform various tasks within the element and/or spawn execution threads to a 3D/Media sub-system 1115. While 3D pipeline 1112 can be used to perform media operations, an embodiment of GPE 1110 also includes a media pipeline 1116 that is specifically used to perform media operations, such as video post-processing and image enhancement.

In some embodiments, media pipeline 1116 includes fixed function or programmable logic units to perform one or more specialized media operations, such as video decode acceleration, video de-interlacing, and video encode acceleration in place of, or on behalf of video codec engine 1106. In some embodiments, media pipeline 1116 additionally includes a thread spawning unit to spawn threads for execution on 3D/Media sub-system 1115. The spawned threads perform computations for the media operations on one or more graphics execution units included in 3D/Media subsystem 1115.

In some embodiments, 3D/Media subsystem 1115 includes logic for executing threads spawned by 3D pipeline 1112 and media pipeline 1116. In one embodiment, the pipelines send thread execution requests to 3D/Media subsystem 1115, which includes thread dispatch logic for arbitrating and dispatching the various requests to available thread execution resources. The execution resources include an array of graphics execution units to process the 3D and media threads. In some embodiments, 3D/Media subsystem 1115 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: a Last Level Cache (LLC) coupled to a plurality of cores of a multi-core processor, the LLC to store data accessible by the plurality of the cores; decoder circuitry to decode an instance of a single instruction, the instance of the single instruction to include a field to indicate a location that is to store a cache block address and an opcode to indicate that execution circuitry is to cause a state of a cache block at the cache block address to be changed to a modified writeback state, wherein a cache block in the modified writeback state is to be written to the LLC upon eviction of the cache block from the L1 cache; and execution circuitry to execute the decoded instance of the single instruction according to the opcode. Example 2 includes the apparatus of example 1, wherein, upon eviction, a cache block in the modified writeback state is to further be allocated in a Level 2 (L2) cache. Example 3 includes the apparatus of example 2, wherein the cache block is to be kept in a shared state in the L2 cache of the first core. Example 4 includes the apparatus of example 1, wherein the cache block comprises one or more cache lines. Example 5 includes the apparatus of example 1, wherein the cache block is to move into a replacement position in the L1 cache for preferential selection for replacement. Example 6 includes the apparatus of example 1, wherein the field to indicate a location that is to store a cache block address is to identify register. Example 7 includes the apparatus of example 1, wherein the multi-core processor, the LLC, and the L1 cache are on a single integrated circuit die. Example 8 includes the apparatus of example 1, wherein the multi-core processor comprises a Graphics Processing Unit (GPU). Example 9 includes the apparatus of example 1, further comprising a performance counter to count a number of local write hits on cache lines in the modified writeback state. Example 10 includes the apparatus of example 1, further comprising a performance counter to count a number of hits caused by a request from a remote core on cache lines in the modified writeback state.

Example 11 includes an apparatus comprising: a Last Level Cache (LLC) coupled to a plurality of cores of a multi-core processor, the LLC to store data accessible by the plurality of the cores; decoder circuitry to decode an instance of a single instruction, the instance of the single instruction to include a field to indicate a location that is to store a cache block address and an opcode to indicate that execution circuitry is to cause: an immediate writeback of a cache block stored in a private cache of a first core of the plurality of cores of the multi-core processor to the LLC; and a change in a state of the cache block to a shared state in the private cache of the first core; and execution circuitry to execute the decoded instance of the single instruction according to the opcode. Example 12 includes the apparatus of example 11, wherein the private cache comprises one or more of an L1 cache and an L2 cache of the first core of the multi-core processor. Example 13 includes the apparatus of example 11, wherein the cache block is a dirty cache block. Example 14 includes the apparatus of example 11, wherein the decoded instance of the single instruction is to writeback the cache block to the LLC without writing the cache lock to main memory. Example 15 includes the apparatus of example 11, wherein the cache block comprises one or more cache lines. Example 16 includes the apparatus of example 11, wherein the decoded instance of the instruction is to change a state of the cache block to an M.wb state in the LLC prior to causing an immediate eviction of the cache block.

Example 17 includes an apparatus comprising: a Last Level Cache (LLC) coupled to a plurality of cores of a multi-core processor, the LLC to store data accessible by the plurality of the cores; decoder circuitry to decode an instance of a single instruction, the instance of the single instruction to include a field to indicate a location that is to store a cache block address and an opcode to indicate that execution circuitry is to cause receipt of a first register and a second register as input arguments, wherein the first register is to store an address of a cache block to be written back to the LLC, wherein the second register is to store an indication of which one of three writeback operations are to be performed in response to the execution of the decoded single instruction, wherein the three writeback operations comprise: a first writeback operation to cause the cache block in a modified state in a Level 1 (L1) cache of a first core of the plurality of cores of the multi-core processor to a Modified write back (M.wb) state; a second writeback operation to cause an immediate writeback of the cache block stored in a private cache of the first core of the plurality of cores of the multi-core processor to the LLC; and a third writeback operation to cause the cache block to move into a replacement position in the L1 cache of the first core; and execution circuitry to execute the decoded instance of the single instruction according to the opcode. Example 18 includes the apparatus of example 17, wherein the M.wb state is to cause the cache block to be written back to LLC upon eviction of the cache block from the L1 cache. Example 19 includes the apparatus of example 17, wherein the private cache comprises one or more of an L1 cache and an L2 cache of the first core of the multi-core processor. Example 20 includes the apparatus of example 17, further comprising one or more performance counters to track hits on blocks in the M.wb state in L1 cache of the first core, wherein content of the one or more performance counters is to cause a change to the indication stored in the second register. Example 21 includes the apparatus of example 17, further comprising one or more performance counters to track hits on blocks in the M.wb state in L1 cache of the first core, wherein content of the one or more performance counters is to cause a change to the indication stored in the second register based on whether a local core or a remote core accessed the blocks in the M.wb state. Example 22 includes the apparatus of example 17, wherein the cache block comprises one or more cache lines.

Example 23 includes one or more non-transitory computer-readable media comprising one or more instructions that when executed on at least one processor configure the at least one processor to perform one or more operations to: decode an instance of a single instruction, the instance of the single instruction to include a field to indicate a location that is to store a cache block address and an opcode to indicate that execution circuitry is to cause a state of a cache block at the cache block address to be changed to a modified writeback state, wherein a cache block in the modified writeback state is to be written to the LLC upon eviction of the cache block from the L1 cache; and execute the decoded instance of the single instruction according to the opcode. Example 24 includes the one or more non-transitory computer-readable media of example 23, further comprising one or more instructions that when executed on the at least one processor configure the at least one processor to perform one or more operations, upon eviction, to allocate a cache block in the modified writeback state in a Level 2 (L2) cache. Example 25 includes the one or more non-transitory computer-readable media of example 23, further comprising one or more instructions that when executed on the at least one processor configure the at least one processor to perform one or more operations to move the cache block into a replacement position in the L1 cache for preferential selection for replacement.

Example 26 includes a method comprising: decoding an instance of a single instruction, the instance of the single instruction to include a field to indicate a location that is to store a cache block address and an opcode to indicate that execution circuitry is to cause a state of a cache block at the cache block address to be changed to a modified writeback state, wherein a cache block in the modified writeback state is to be written to the LLC upon eviction of the cache block from the L1 cache; and executing the decoded instance of the single instruction according to the opcode. Example 27 includes the method of example 26, further comprising, upon eviction, to allocating a cache block in the modified writeback state in a Level 2 (L2) cache. Example 28 includes the method of example 26, further comprising moving the cache block into a replacement position in the L1 cache for preferential selection for replacement.

Example 29 includes an apparatus comprising means to perform a method as set forth in any preceding example. Example 30 includes machine-readable storage including machine-readable instructions, when executed, to implement a method or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a Last Level Cache (LLC) coupled to a plurality of cores of a multi-core processor, the LLC to store data accessible by the plurality of the cores;
decoder circuitry to decode an instance of a single instruction, the instance of the single instruction to include a field to indicate a location that is to store a cache block address and an opcode to indicate that execution circuitry is to cause a state of a cache block at the cache block address to be changed to a modified writeback state, wherein the cache block in the modified writeback state is to indicate that the cache block is stored to both the LLC and a Level 2 (L2) cache upon eviction of the cache block from a Level 1 (L1) cache; and
execution circuitry to execute the decoded instance of the single instruction according to the opcode.

2. The apparatus of claim 1, wherein the cache block is to be kept in a shared state in the L2 cache of a first core from the plurality of cores.

3. The apparatus of claim 1, wherein the cache block comprises one or more cache lines.

4. The apparatus of claim 1, wherein the cache block is to move into a replacement position in the L1 cache for preferential selection for replacement.

5. The apparatus of claim 1, wherein the field to indicate a location that is to store a cache block address is to identify a register.

6. The apparatus of claim 1, wherein the multi-core processor, the LLC, and the L1 cache are on a single integrated circuit die.

7. The apparatus of claim 1, wherein the multi-core processor comprises a Graphics Processing Unit (GPU).

8. The apparatus of claim 1, further comprising a performance counter to count a number of local write hits on cache lines in the modified writeback state.

9. The apparatus of claim 1, further comprising a performance counter to count a number of hits caused by a request from a remote core on cache lines in the modified writeback state.

10. The apparatus of claim 1, wherein the L2 cache is private to a core from the plurality of cores.

11. One or more non-transitory computer-readable media comprising one or more instructions that when executed on at least one processor configure the at least one processor to perform one or more operations to:

decode an instance of a single instruction, the instance of the single instruction to include a field to indicate a location that is to store a cache block address and an opcode to indicate that execution circuitry is to cause a state of a cache block at the cache block address to be changed to a modified writeback state, wherein the cache block in the modified writeback state is to indicate that the cache block is stored to both a Last Level Cache (LLC) and a Level 2 (L2) cache upon eviction of the cache block from a Level 1 (L1) cache; and execute the decoded instance of the single instruction according to the opcode.

12. The one or more non-transitory computer-readable media of claim 11, further comprising one or more instructions that when executed on the at least one processor configure the at least one processor to perform one or more operations to move the cache block into a replacement position in the L1 cache for preferential selection for replacement.

13. The one or more non-transitory computer-readable media of claim 11, further comprising one or more instructions that when executed on the at least one processor configure the at least one processor to perform one or more operations to keep the cache block in a shared state in the L2 cache of a first core from a plurality of cores.

14. The one or more non-transitory computer-readable media of claim 11, further comprising one or more instructions that when executed on the at least one processor configure the at least one processor to perform one or more operations to update a performance counter to count a number of local write hits on cache lines in the modified writeback state.

\* \* \* \* \*